United States Patent
Jang (10) Patent No.: US 9,177,583 B2
(45) Date of Patent: Nov. 3, 2015

(54) HARD DISK DRIVE AND METHOD FOR CONTROLLING FLYING HEIGHT OF MAGNETIC HEAD THEREOF

(75) Inventor: Kwang Hyun Jang, Yongin-si (KR)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 13/538,735

(22) Filed: Jun. 29, 2012

(65) Prior Publication Data

US 2013/0003220 A1 Jan. 3, 2013

(30) Foreign Application Priority Data

Jun. 30, 2011 (KR) .................. 10-2011-0064161

(51) Int. Cl.
| | |
|---|---|
| *G11B 21/02* | (2006.01) |
| *G11B 27/36* | (2006.01) |
| *G11B 5/60* | (2006.01) |
| *G11B 5/56* | (2006.01) |

(52) U.S. Cl.
CPC ............ *G11B 5/6029* (2013.01); *G11B 5/6011* (2013.01); *G11B 5/56* (2013.01); *G11B 5/6076* (2013.01); *G11B 27/36* (2013.01)

(58) Field of Classification Search
None
See application file for complete search history.

(56) References Cited

U.S. PATENT DOCUMENTS

| | | | | |
|---|---|---|---|---|
| 7,957,086 | B2 * | 6/2011 | Lee et al. .................... | 360/59 |
| 8,320,069 | B1 * | 11/2012 | Knigge et al. ................ | 360/75 |
| 2008/0043363 | A1 * | 2/2008 | Yamashita et al. ............ | 360/75 |
| 2008/0247073 | A1 * | 10/2008 | Park ........................... | 360/59 |
| 2008/0266704 | A1 * | 10/2008 | Kim et al. .................... | 360/75 |
| 2009/0141391 | A1 * | 6/2009 | Kuramoto et al. ............ | 360/75 |
| 2010/0177430 | A1 * | 7/2010 | Mathew et al. ............... | 360/75 |
| 2012/0033323 | A1 * | 2/2012 | Mathew et al. ............... | 360/75 |

\* cited by examiner

*Primary Examiner* — Andrew L Sniezek
(74) *Attorney, Agent, or Firm* — Hollingsworth Davis, LLC

(57) ABSTRACT

There is disclosed a hard disk drive and a method of controlling a flying height of a magnetic head of the hard disk drive. A method of controlling a flying height of the magnetic head in a hard disk drive according to an embodiment of the present invention may include (a) providing a FOD sensitivity through a FOD test; (b) reading a preamble signal of a servo pattern; (c) calculating a flying height of the magnetic head from the preamble signal; and (d) applying FOD power for adapting the flying height of the magnetic head to a target flying height of the magnetic head based on the calculated flying height of the magnetic head and the FOD sensitivity.

11 Claims, 6 Drawing Sheets

HARD DISK DRIVE AND METHOD FOR CONTROLLING FLYING HEIGHT OF MAGNETIC HEAD THEREOF

RELATED APPLICATION

Pursuant to 35 U.S.C. §119(a), this application claims the benefit of Korean Application No. 10-2011-0064161, filed on Jun. 30, 2011, the contents of which is incorporated by reference herein in its entirety.

BACKGROUND OF THE INVENTION

1. Field of the Invention

The present invention relates to a hard disk drive and a method of controlling a flying height of a magnetic head of the hard disk drive, and more particularly, to a hard disk drive for measuring a flying height of the magnetic head using a preamble signal of the servo pattern in real time and controlling the flying height of the magnetic head to a target flying height based on this and a method of controlling a flying height of a magnetic head of the hard disk drive.

2. Description of the Related Art

Hard disk drive, which is a storage device consisted of an electronic device and a mechanical device for converting digital electronic pulses into a more permanent magnetic field to record and reproduce data, is widely used as an auxiliary storage device of the computer system or the like in recent years since a large amount of data can be accessed at high speed.

The capacity of the hard disk drive has been increased by implementing high track per inch (TPI) and high bits per inch (BPI) in recent years. As the capacity of the hard disk drive is increased, the size of a write/read element of the magnetic head has been reduced, and thus the flying height (FH) of the magnetic head that flies on the disk surface has been gradually decreased.

In other words, when high track per inch (TPI) and high bits per inch (BPI) are implemented to fabricate a high-capacity hard disk drive, the width of a track is decreased, and if the width of a track is decreased, then the intensity of a magnetic field detected from the track is weakened. Accordingly, in this case, if the flying height (FH) of the magnetic head is increased, then it may cause difficulty in detecting a magnetic field, thereby further increasing the possibility that the operation of the hard disk drive is carried out in an inefficient manner.

Accordingly, studies on a method of properly controlling the flying height (FH) of a magnetic head to effectively reduce the flying height of the magnetic head with respect to the disk have been actively carried out, and flying on demand (FOD) is taken into consideration for one of them.

Flying on demand (FOD) is a method of controlling the flying height of a magnetic head using a magnetic head flying height reduction characteristic being occurred when a pole tip that is an end portion of the magnetic head is thermally expanded while the hard disk drive is operated by applying a constant voltage (FOD voltage) to a heater which is built in the magnetic head.

However, the environments in which the hard disk drive is used in actuality are quite varied and thus the flying height of a magnetic head cannot always have the sameness, and thus even if a FOD voltage required for the target flying height is applied to a user environment in which the hard disk drive is used, the flying height of the magnetic head may be varied according to the user's environment.

In particular, the flying height of the hard disk drive may be mostly affected by a change of the ambient temperature and atmospheric pressure, and thus when the hard disk drive is used in a user's environment by applying a unified reference FOD voltage profile it may occur a case where the target flying height of the magnetic head cannot be maintained by a complicated operation due to various environmental parameters, and therefore, when the target flying height of the magnetic head cannot be maintained as described above, there is a drawback of causing weak write or head/disk interference (HDI) related problems.

SUMMARY OF THE INVENTION

The embodiments of the present invention are to provide a hard disk drive for measuring a flying height of the magnetic head using a servo preamble signal being read when approaching the target track in real time, and applying FOD power suitable to a target flying height of the magnetic head based on this to control the flying height of the magnetic head to the target flying height, and a method of controlling a flying height of a magnetic head of the hard disk drive.

According to an aspect of the present invention, there is provided a method of controlling a flying height of the magnetic head in a hard disk drive, and the method may include (a) providing a FOD sensitivity through a FOD test; (b) reading a preamble signal of a servo pattern; (c) calculating a flying height of the magnetic head from the preamble signal; and (d) applying FOD power for adapting the flying height of the magnetic head to a target flying height based on the calculated flying height of the magnetic head and the FOD sensitivity.

The step (a) may include (a1) calculating a flying height (FHini) of the magnetic head in a state that flying on demand (FOD) power is not applied thereto; (a2) calculating the flying height of the magnetic head using the preamble signal of the servo pattern while gradually increasing the FOD power; and (a3) calculating a FOD sensitivity from the flying height of the magnetic head according to the applied FOD power.

The step (a2) may include (a21) performing discrete Fourier transform on the preamble signal to calculate a first harmonic and a third harmonic component; and (a22) calculating a flying height of the magnetic head from the first harmonic and the third harmonic component.

The step (a3) may repeat calculating the flying height of the magnetic head while gradually increasing the FOD power two or more times to calculate a change of the flying height of the magnetic head ($\Delta FH$) according to the FOD power applied at each step, and obtain an average value of (a change of the flying height of the magnetic head)/(applied FOD power) to calculate a FOD sensitivity.

The step (b) may use a preamble signal being read to obtain a servo auto gain control (SAGC) value from an auto gain control (AGC) loop while the magnetic head approaches a target track.

The step (c) may include (c1) performing discrete Fourier transform on the preamble signal to calculate a first harmonic and a third harmonic component; and (c2) calculating a flying height of the magnetic head from the first harmonic and the third harmonic component.

In the step (d), the FOD power applied to adapt the flying height of the magnetic head to a target flying height may be calculated by a value of (the calculated flying height of the magnetic head−target flying height)/(FOD sensitivity).

The servo pattern may be a 2T pattern in the form of two negative samples and two positive samples being periodically linked.

According to another aspect of the present invention, there is provided a hard disk drive including a magnetic head configured to read a preamble signal of a servo pattern; and a controller configured to receive the preamble signal to calculate a first and a third harmonic component, and calculate a flying height of the magnetic head from the first and the third harmonic component.

The controller may apply FOD power for adapting the flying height of the magnetic head to a target flying height based on the calculated flying height of the magnetic head and a FOD sensitivity provided from a FOD test.

The FOD sensitivity may be provided from a burn-in process which is one of fabrication processes of the hard disk drive and stored in a maintenance cylinder of the disk.

According to the embodiments of the present invention, there is provided a hard disk drive for measuring a flying height of the magnetic head using a servo preamble signal being read when approaching the target track in real time, and applying FOD power suitable to a target flying height of the magnetic head based on this to control the flying height of the magnetic head to the target flying height, and a method of controlling a flying height of a magnetic head of the hard disk drive.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

The accompanying drawings illustrating a preferred embodiment of the present invention and the content disclosed in the drawings should be referred to for the purpose of sufficiently understanding the present invention, operational advantages thereof, and the purpose accomplished by an embodiment of the present invention.

Hereinafter, the present invention will be described in detail by explaining preferred embodiments of the present invention with reference to the accompanying drawings. The same reference numerals disclosed in each drawing represents the same constituent elements.

Figure 1:
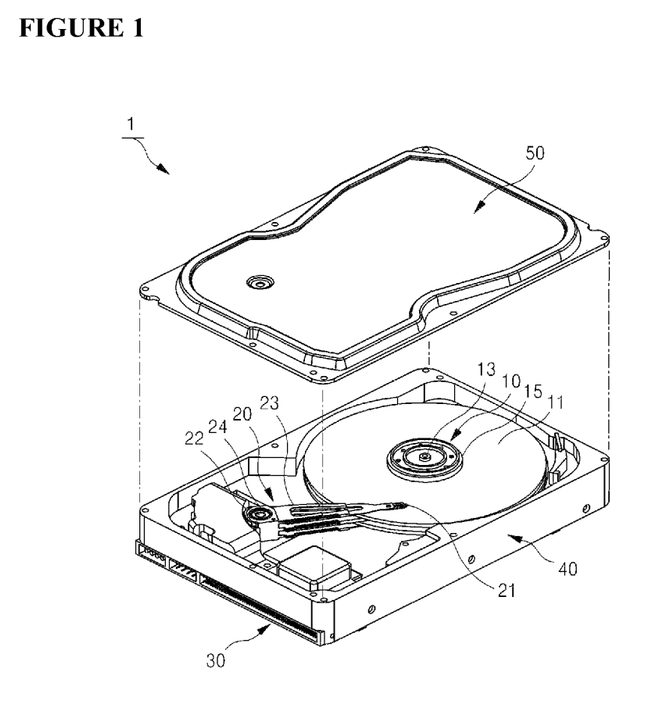
FIG. 1 is a partially exploded perspective view illustrating a hard disk drive according to an embodiment of the present invention.

FIG. 1 is a partially exploded perspective view illustrating a hard disk drive according to an embodiment of the present invention.

As illustrated in FIG. 1, a hard disk drive 1 according to an embodiment of the present invention may include a disk pack 10 having at least one disk 11 on which data is recorded, a head stack assembly (HAS) 20 having a magnetic head 21 for recording and reproducing data on the disk 11, a printed circuit board assembly (PCBA) 30, a base 40 into which those elements are assembled, and a cover 50 for covering the base.

The disk pack 10 in which several circular disks 11 are stationed at the same axis is an assembly of the medium on which data is recorded. According to the present embodiment, the disk pack 10 may include a circular disk 11, a shaft 13 for forming a rotational shaft center, a spindle motor hub (not shown) configured to support the disk 11 and rotated together with the disk 11, a clamp 15 combined with an upper portion of the spindle motor hub, and a clamp screw (not shown) configured to allow the disk 11 to be fixed to the spindle motor hub.

The head stack assembly 20 may include a magnetic head 21 for writing data or reading recorded data on the disk 11, an actuator arm 23 revolved on the disk 11 around the pivot shaft 22 to allow the magnetic head 21 to access data on the disk 11, a pivot shaft holder 24 configured to rotatably support the pivot shaft 22 and combined with the actuator arm 23 to be supported thereto, and a bobbin (not shown) on which a VCM coil (not shown) is wound provided at the pivot shaft holder 24 in the direction opposite to the actuator arm 23 to be located between the voice coil motor (VCM) (not shown) and the magnet (not shown).

The magnetic head 21 may sense a magnetic field formed on a surface of the disk 11 or magnetize a surface of the disk 11 to read or record information from or to the disk 11 being rotated. The magnetic head 21 may include a write head for magnetizing the disk 11 and a read head for sensing a magnetic field of the disk 11 to read and write data.

Figure 2:
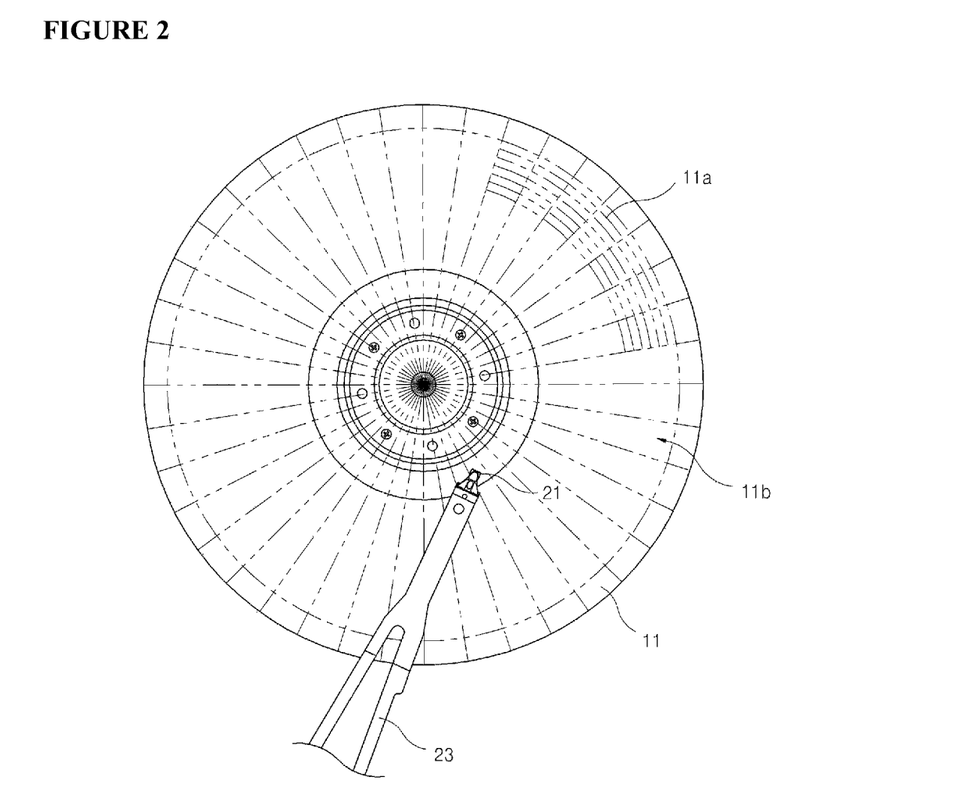
FIG. 2 is a schematic plan view illustrating a disk region in the hard disk drive of FIG. 1.
Figure 3:
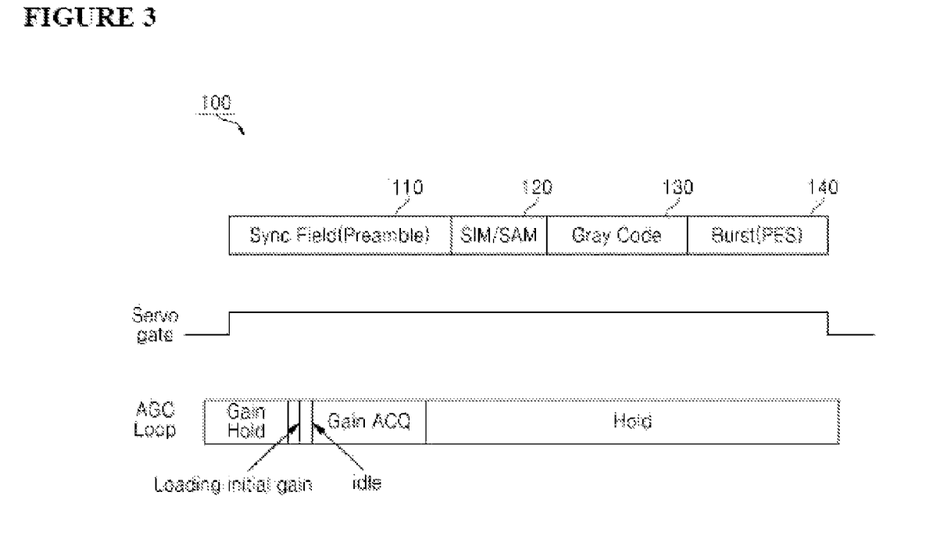
FIG. 3 is a view illustrating the configuration of a servo pattern formed on the disk of FIG. 2.

FIG. 2 is a schematic plan view illustrating a disk region in the hard disk drive of FIG. 1, and FIG. 3 is a view illustrating the configuration of a servo pattern formed on the disk of FIG. 2.

Referring to FIG. 2, the disk 11 for recording and storing data is formed with a track 11a as an object in which servo information and data information are stored, and a sector 11b in a unit object that is divided into equiangular intervals with respect to the rotational shaft center.

Furthermore, on the track 11a, a servo sector for servo control such as track seeking and track following, and a data sector for recording the user's data thereon are alternatively located.

Referring to FIG. 3, a servo pattern 100 formed on the servo sector may include a preamble 110, a servo address mark (SAM) 120, a gray code 130, and a burst 140.

The preamble 110 is to indicate a servo sector by providing a clock sync as well as providing a gap prior to the servo sector when reading servo information, and may be also referred to as a servo sync. Furthermore, the SAM 120 notifies a start of the servo and provides a sync for reading gray code 130 subsequently being followed. In other words, the SAM 120 is provided as a reference point for generating various timing pulses associated with servo control. On the other hand, the gray code 130 provides information on each track 11a, namely, track information. The burst 140 provides a position error signal (PES) required for track seeking and track following.

According to the present embodiment, when the magnetic head 21 reads a preamble 110 signal of the servo pattern 100, the magnetic head 21 measures a flying height of the magnetic head 21 using the read preamble 110 signal. At this time, the servo pattern 100 according to the present embodiment is formed in a 2T pattern in the form of two negative samples and two positive samples being periodically linked. The preamble 110 pattern of the servo pattern 100 is formed as a 2T pattern, thereby having the effect of obtaining a clear signal with low interference when the magnetic head 21 reads the preamble 110 signal.

A method of measuring a flying height of the magnetic head 21 using the preamble 110 signal will be described later.

Figure 4:
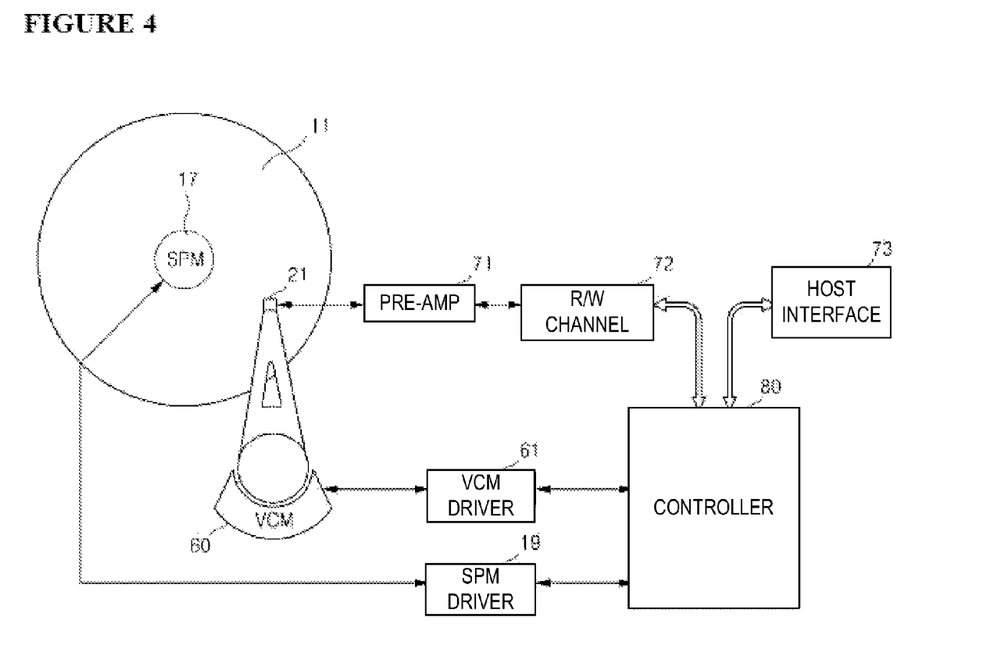
FIG. 4 is a schematic block diagram illustrating a drive circuit of the hard disk drive of FIG. 1.
Figure 5:
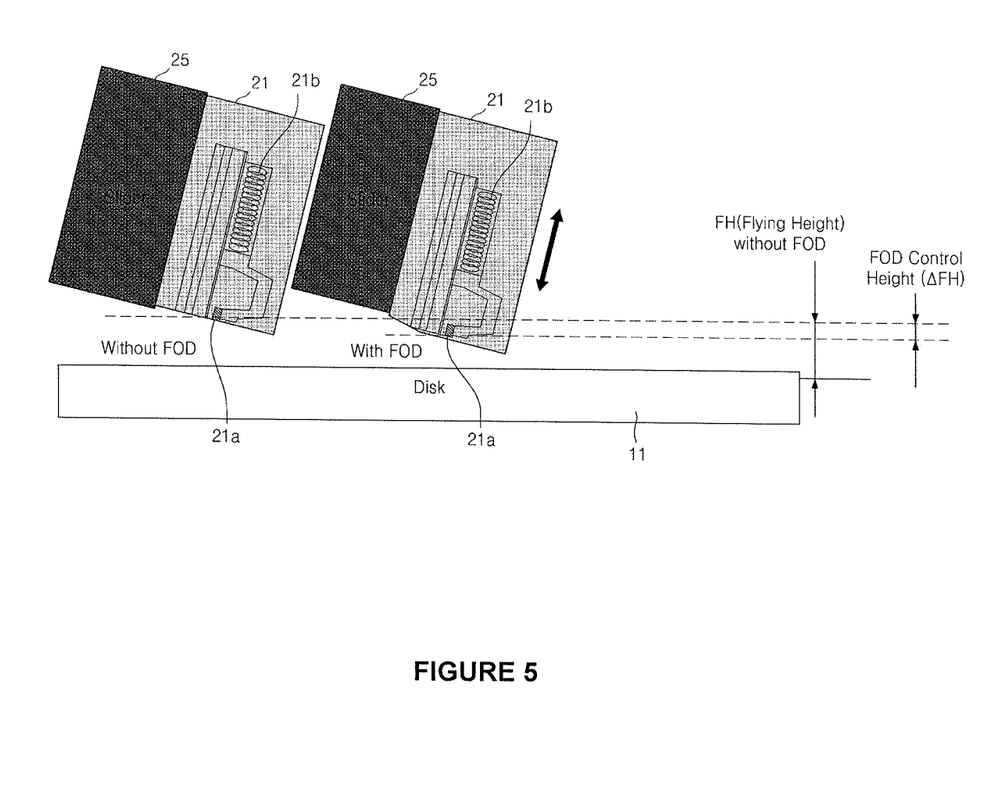
FIG. 5 is a view for schematically explaining a flying height of the magnetic head in the hard disk drive of FIG. 1.

FIG. 4 is a schematic block diagram illustrating a drive circuit of the hard disk drive of FIG. 1, and FIG. 5 is a view for schematically explaining a flying height of the magnetic head in the hard disk drive of FIG. 1.

Referring to FIG. 4, the hard disk drive 1 may include a pre-AMP 71, a read/write (R/W) channel 72, a host interface 73, a voice coil motor (VCM) driver 61, a spindle motor (SPM) driver 19, and a controller 80 as a driving circuit.

The pre-AMP 71 amplifies a read signal generated by sensing a magnetic field from the disk 11 using a read head (not shown) to output it to the read/write channel 72, or amplifies a current having a constant waveform received from the read/write channel 72 to supply it to a write head (not shown).

The read/write (R/W) channel 72 converts a read signal amplified by the pre-AMP 71 into a digital signal to output to the controller 80. Furthermore, the read/write channel 72 receives data that has been received by a host interface 73 through the controller 80 and converts it into an analog signal to output to the pre-AMP 71.

The host interface 73 transmits data converted into a digital signal to the host device (not shown) in a data read mode, and receives data entered by the user and outputs it to the controller 80 in a data write mode.

Here, the host device is used as the meaning of referring to elements for controlling and operating the entire computer including a hard disk drive 1 such as CPU, I/O controller in the computer as a whole.

The voice coil motor (VCM) driver 61 adjusts an amount of current applied to the voice coil motor 60 under the control of the controller 80.

The spindle motor (SPM) driver 19 adjusts an amount of current applied to the spindle motor 17 under the control of the controller 80.

The controller 80 receives data entered by the user through the host device to output it to the read/write channel 72 through the host interface 73 in a data write mode, and receives a read signal that has been converted into a digital signal by the read/write channel 72 to output it to the host interface 73 in a data read mode. Furthermore, the controller 80 controls the output of the voice coil motor (VCM) driver 61 and spindle motor driver 19.

The controller 80 may be a micro processor, a micro controller, and the like, and may be also implemented in the form of software or firmware executing a method of controlling a flying height of the magnetic head 21 in the hard disk drive 1 which will be described later.

The controller 80 according to the present embodiment receives a preamble 110 signal being read to obtain a servo auto gain control (SAGC) value from an auto gain control (AGC) loop while the magnetic head 21 approaches a target track, and calculates a first harmonic and a third harmonic component of the preamble 110 signal, and calculates a flying height of the magnetic head 21 from the calculated first harmonic and the third harmonic component. Furthermore, the flying height of the magnetic head 21 can be maintained in real time by applying FOD power for adapting the flying height of the magnetic head 21 to a target flying height based on the calculated flying height of the magnetic head 21 and a FOD sensitivity which will be described later.

The flying height (FH) of the magnetic head 21 and the flying on demand (FOD) will be described in brief. Referring to FIG. 5, the magnetic head 21 is adhered to a slider 25 adhered to an end portion of the actuator arm 23, and if the slider 25 is flown by the rotation of the disk 11 then the magnetic head 21 is also flown together, thereby being operated while maintaining a predetermined gap.

At this time, the controller 80 applies constant power (FOD power) to a heater which is built in the magnetic head 21 to control the flying height of the magnetic head 21 using a magnetic head 21 flying height (FH) reduction characteristic being occurred when a pole tip that is an end portion of the magnetic head is thermally expanded while the hard disk drive 1 is operated.

On the other hand, hereinafter, a method of controlling a flying height of the magnetic head 21 in the hard disk drive 1 will be described in detail with reference to FIGS. 3, 6 through 8. However, the same description as described in the hard disk drive 1 according to the present embodiment will be omitted.

Figure 6:
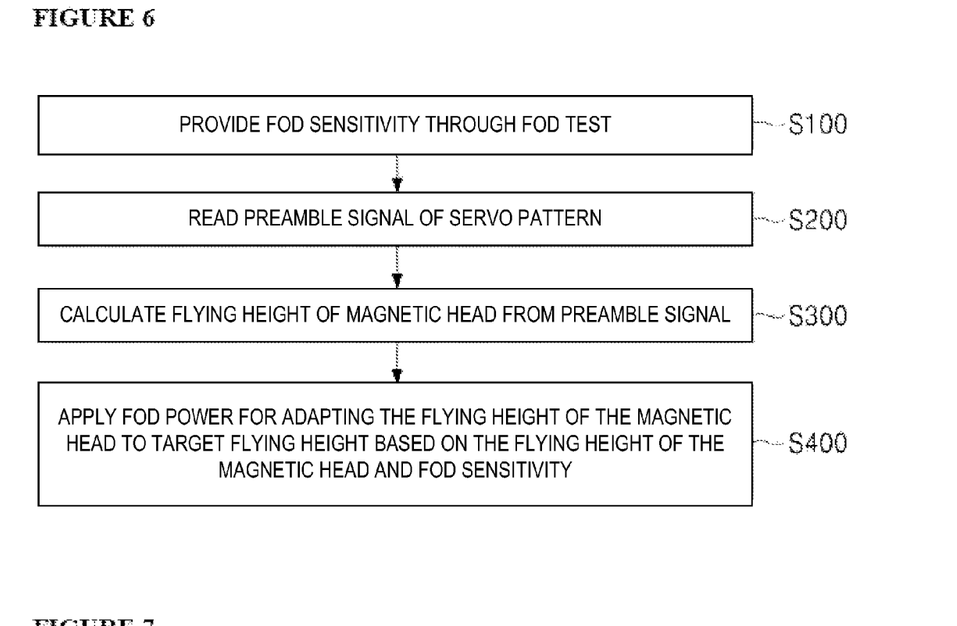
FIG. 6 is a flow chart illustrating the method of controlling a flying height of the magnetic head in a hard disk drive according to an embodiment of the present invention.
Figure 7:
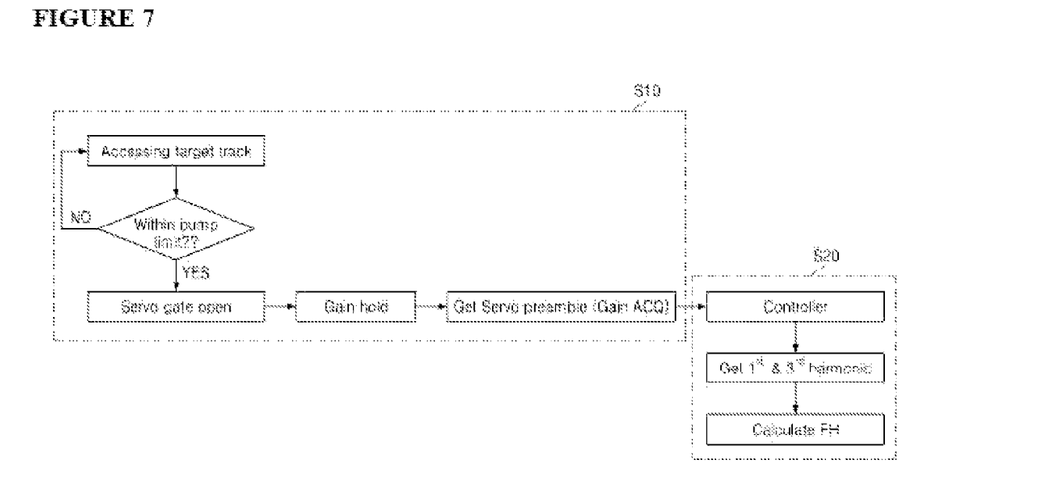
FIG. 7 is a flow chart illustrating the method of measuring a flying height of the magnetic head.
Figure 8:
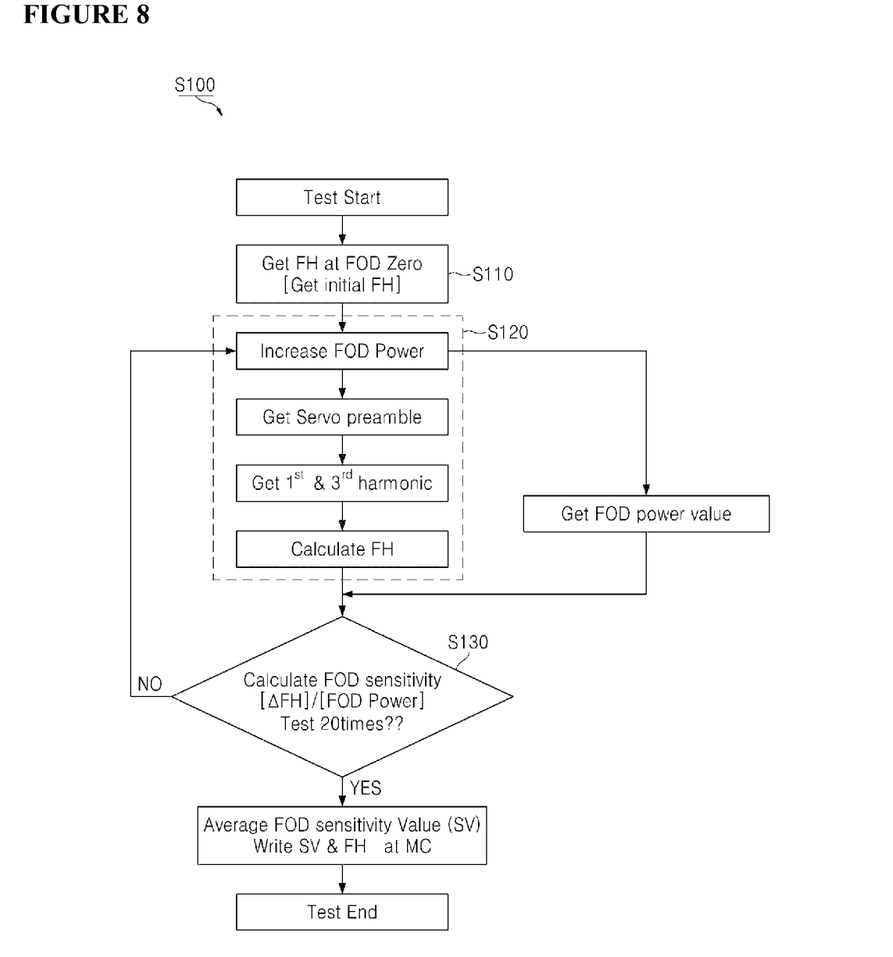
FIG. 8 is a flow chart illustrating a FOD test.

FIG. 6 is a flow chart illustrating the method of controlling a flying height of the magnetic head in a hard disk drive according to an embodiment of the present invention, and FIG. 7 is a flow chart illustrating the method of measuring a flying height of the magnetic head, and FIG. 8 is a flow chart illustrating a FOD test.

Referring to FIG. 6, a method of controlling a flying height of the magnetic head 21 in the hard disk drive 1 according to the present embodiment may include providing a FOD sensitivity through a FOD test (S100), reading a preamble signal 110 of the servo pattern 100 (200), calculating a flying height of the magnetic head 21 from the preamble signal 110 (S300), and applying FOD power for adapting the flying height of the magnetic head 21 to a target flying height based on the calculated flying height of the magnetic head 21 and the FOD sensitivity.

First, prior to describing a method of controlling a flying height of the magnetic head 21 in the hard disk drive 1 according to the present embodiment, a method of measuring a flying height of the magnetic head 21 in the hard disk drive 1 used in the present embodiment will be described.

Referring to FIG. 7, the method of controlling a flying height of the magnetic head 21 in the hard disk drive 1 may include reading a preamble 110 signal of the servo pattern 100 (S10), and calculating a flying height of the magnetic head 21 from the preamble 110 signal (S20).

The step of reading a preamble 110 signal of the servo pattern 100 (S10) uses a preamble 110 signal being read to obtain a servo auto gain control (SAGC) value from an auto gain control (AGC) loop while the magnetic head 21 approaches a target track. Due to this, the flying height of the magnetic head 21 can be measured while the magnetic head 21 approaches to the target track without the process of writing or reading additional data to the disk 11.

In the AGC loop, referring to FIG. 3, a servo gate is open to read the servo pattern 100 within a bump limit when the magnetic head 21 approaches the target track, and the preamble 110 signal within the servo pattern 100 is obtained by driving the AGC loop.

At this time, the servo pattern 100 is formed with a 2T pattern in the form of two negative samples and two positive samples being periodically linked, thereby having the effect of obtaining a clear signal with low interference when the magnetic head 21 reads the preamble 110 signal.

The read preamble 110 signal is transmitted to the controller 80.

The controller 80 calculates a flying height of the magnetic head 21 from the transmitted preamble 110 signal, and first, discrete Fourier transform is carried out on the preamble 110 signal to calculate a first harmonic and a third harmonic component, and a flying height of the magnetic head 21 is calculated from the calculated first harmonic and the third harmonic component. At this time, the method of calculating a flying height of the magnetic head 21 from the first harmonic and the third harmonic component calculates a flying height of the magnetic head 21 based on a correlation or functional relation between the amplitudes of the first harmonic and the third harmonic component.

According to such a method of measuring a flying height of the magnetic head 21, the flying height of the magnetic head 21 can be measured in real time using the preamble 110 signal being read while approaching the target track, thereby controlling the flying height of the magnetic head 21 in the hard disk drive 1 to a target flying height in real time. Accordingly, it has an effect of more precisely measuring and controlling the flying height of the magnetic head 21 that may be changed according to the use environment of the hard disk drive 1.

On the other hand, referring to FIG. 8, the step of providing a FOD sensitivity through a FOD test (S100) may include calculating a flying height (FHini) of the magnetic head 21 in a state that flying on demand (FOD) power is not applied thereto (S110), calculating the flying height of the magnetic head 21 using the preamble 110 signal of the servo pattern 100 while gradually increasing the FOD power (S120), and calculating a FOD sensitivity from the flying height of the magnetic head 21 according to the applied FOD power (S130).

During the FOD test process, first, the flying height (FHini) of the magnetic head 21 is measured in a state that flying on demand (FOD) power is not applied thereto. The method of measuring the flying height of the magnetic head 21 is carried out by a method of calculating a flying height of the magnetic head 21 using the foregoing preamble 110 signal.

Next, the flying height of the magnetic head 21 is measured using the preamble 110 signal of the servo pattern 100 while gradually increasing the FOD power applied to the magnetic head 21, and discrete Fourier transform is carried out on the preamble 110 signal to calculate a first harmonic and a third harmonic component, and the flying height of the magnetic head 21 is calculated from the first harmonic and the third harmonic component.

At this time, the step of calculating the flying height of the magnetic head 21 while gradually increasing the FOD power is repeated two or more times to calculate a change of the flying height of the magnetic head ($\Delta FH$) according to the FOD power applied at each implementation step, and an average value of (a change of the flying height of the magnetic head 21)/(applied FOD power) is obtained to calculate a FOD sensitivity.

The flying height (FHini) of the magnetic head 21 may be stored and used in a maintenance cylinder (MC) of the disk 11 during a burn-in process in a state that the FOD sensitivity calculated through the FOD test process and FOD power is not applied thereto.

On the other hand, the step of measuring the flying height of the magnetic head 21 is carried out to control the flying height of the magnetic head 21. In the step of measuring the flying height of the magnetic head 21, a preamble 110 signal of the servo pattern 100 is read, and discrete Fourier transform is carried out on the preamble 110 signal to calculate a first harmonic and a third harmonic component, and then the flying height of the magnetic head 21 is calculated from the first harmonic and the third harmonic component as illustrated in the method of measuring the flying height of the magnetic head 21 in the hard disk drive 1 according to an embodiment of the present invention.

Next, in order to control the flying height of the magnetic head 21 to a target flying height, FOD power for adapting the flying height of the magnetic head 21 to the target flying height by referring to the FOD sensitivity based on the measured flying height of the magnetic head 21 is applied thereto. At this time, the applied FOD power can be obtained by an equation of (the calculated flying height of the magnetic head−target flying height)/(FOD sensitivity).

In other words, if the flying height of the magnetic head 21 being reduced when FOD power is applied at the measured flying height of the magnetic head 21 is added or subtracted, then a target flying height of the magnetic head 21 is calculated.

As described above, according to a method of controlling the flying height of the magnetic head 21 in the hard disk drive 1 of the present invention, the flying height of the magnetic head 21 can be measured in real time using the preamble 110 signal being read while approaching the target track, and thus the flying height of the magnetic head 21 in the hard disk drive 1 can be controlled in real time to a target flying height. Furthermore, a FOD sensitivity may be provided and used for each hard disk drive 1 without using a uniformly applied FOD power standard, thereby having the effect of more precisely measuring and controlling the flying height of the magnetic head 21 that may be varied according to the use environment.

Moreover, the present invention will not be limited to the embodiments disclosed herein, and it will be apparent to those skilled in this art that various modifications and variations can be made thereto without departing from the spirit and scope of the present invention. Those modification and variation examples should be construed to be included in the claims of the present invention.

[FIG. 1]
1 hard disk drive
10 disk pack
11 disk
13 shaft
15 clamp
20 head stack assembly
21 magnetic head
22 pivot shaft
23 actuator arm
24 pivot shaft holder
30 printed circuit board assembly
40 base
50 cover
[FIG. 2]
11 disk
11a track
11b sector
23 actuator arm
[FIG. 4]
11 disk
21 magnetic head
71 pre-amp
72 R/W channel
73 host interface
61 VCM driver
19 SPM driver
80 controller

[FIG. 6]
S100 Provide FOD sensitivity through FOD test
S200 Read preamble signal of servo pattern
S300 Calculate flying height of magnetic head from the preamble signal
S400 Apply FOD power for adapting the flying height of the magnetic head to target flying height based on the flying height of the magnetic head and FOD sensitivity

What is claimed is:

1. A method comprising:
   (a) providing a flying on demand (FOD) sensitivity through a FOD test, the FOD sensitivity being calculated by determining a change of flying height of a magnetic head ($\Delta$FH) according to FOD power applied to effect the change on demand during operation of the magnetic head, comprising:
      (a1) calculating a flying height (FHini) of the magnetic head in a state that FOD power is not applied thereto;
      (a2) calculating the flying height of the magnetic head using a preamble signal of a servo pattern while gradually increasing the FOD power; and
      (a3) calculating a FOD sensitivity from the flying height of the magnetic head according to the applied FOD power comprising repeating calculating the flying height of the magnetic head while gradually increasing the FOD power two or more times to calculate $\Delta$FH according to the FOD power applied at each step, and obtaining an average value of (a change of the flying height of the magnetic head)/(applied FOD power) to calculate a FOD sensitivity;
   (b) reading a preamble signal of a servo pattern in a user's environment, the user's environment including variations in temperature;
   (c) calculating a flying height of the magnetic head from the preamble signal; and
   (d) applying FOD power for adapting the flying height of the magnetic head to a target flying height based on the calculated flying height of the magnetic head and the FOD sensitivity.

2. The method of claim 1, wherein the step (a2) comprises:
   (a21) performing discrete Fourier transform on the preamble signal to calculate a first harmonic and a third harmonic component; and
   (a22) calculating a flying height of the magnetic head from the first harmonic and the third harmonic component.

3. The method of claim 1, wherein the step (b) uses a preamble signal being read to obtain a servo auto gain control (SAGC) value from an auto gain control (AGC) loop while the magnetic head approaches a target track.

4. The method of claim 3, wherein in the step (d), the FOD power applied to adapt the flying height of the magnetic head to a target flying height is calculated by a value of (the calculated flying height of the magnetic head–target flying height)/ (FOD sensitivity).

5. The method of claim 1, wherein the step (c) comprises:
   (c1) performing discrete Fourier transform on the preamble signal to calculate a first harmonic and a third harmonic component; and
   (c2) calculating a flying height of the magnetic head from the first harmonic and the third harmonic component.

6. The method of claim 1, wherein the servo pattern is a 2T pattern in the form of two negative samples and two positive samples being periodically linked.

7. An apparatus comprising:
   a magnetic head configured to read a preamble signal of a servo pattern; and
   a controller configured to receive the preamble signal to calculate a first and a third harmonic component in a user's environment, the user's environment including variations in temperature, calculate a flying height of the magnetic head from the first and the third harmonic component, and apply flying on demand (FOD) power to adapt the flying height of the magnetic head to a target flying height based on the calculated flying height of the magnetic head and a FOD sensitivity provided from a FOD test, the controller being further configured to calculate the FOD sensitivity by determining a change of flying height of the magnetic head ($\Delta$FH) according to FOD power applied to effect the change on demand during operation of the magnetic head and by further calculating the flying height in a state that FOD power is not applied to the magnetic head, calculating the flying height using the preamble signal of the servo pattern while gradually increasing the FOD power two or more times to calculate a change of the flying height of the magnetic head according to the FOD power applied at each step and calculating the FOD sensitivity from the flying height according to the gradually increasing FOD power by obtaining an average value of (a change of the flying height of the magnetic head)/(applied FOD power).

8. The apparatus of claim 7, wherein the controller is configured to calculate the flying height using the preamble signal of the servo pattern while gradually increasing the FOD power by performing discrete Fourier transform on the preamble signal to calculate the first harmonic and the third harmonic component.

9. The apparatus of claim 7, wherein the controller is configured to use the preamble signal being read to obtain a servo auto gain control value from an auto gain control loop while the magnetic head approaches a target track.

10. The apparatus of claim 7, wherein the FOD power applied to adapt the flying height of the magnetic head to the target flying height is calculated by a value of (the calculated flying height of the magnetic head–target flying height)/ (FOD sensitivity).

11. The apparatus of claim 7, wherein the servo pattern is a 2T pattern in the form of two negative samples and two positive samples being periodically linked.

* * * * *